Dec. 11, 1951          J. H. GRIFFIN           2,577,889
        METHOD AND APPARATUS FOR GRINDING FLAT
         GLASS ON BOTH FACES SIMULTANEOUSLY
                Filed Aug. 26, 1949
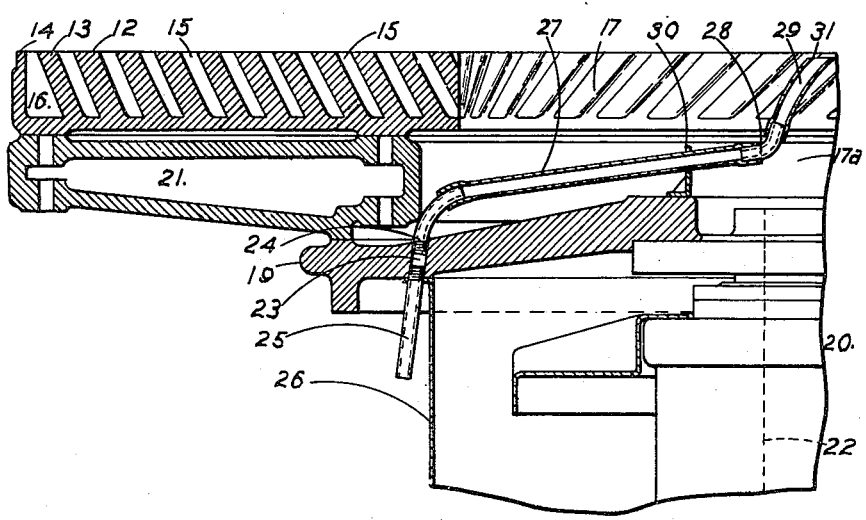
Inventor
James Harris Griffin
By
Morrison, Kennedy & Campbell
Attorneys

UNITED STATES PATENT OFFICE 2,577,889

METHOD AND APPARATUS FOR GRINDING FLAT GLASS ON BOTH FACES SIMULTANEOUSLY

James Harris Griffin, Moss Bank, St. Helens, England, assignor to Pilkington Brothers Limited, Liverpool, England, a corporation of Great Britain Application August 26, 1949, Serial No. 112,522

6 Claims. (Cl. 51—283)

This invention relates to methods of and apparatus for grinding flat glass on both faces simultaneously and especially to methods of and apparatus for continuously grinding the underface of horizontally disposed flat glass in ribbon form simultaneously with the grinding of the upper face.

In grinding glass in horizontal ribbon form, it is usual to grind the ribbon of glass, which is formed from molten glass in a tank, on both faces simultaneously as it travels forward from the lehr, by employing pairs of opposed grinder discs, each rotating about a vertical axis, between which discs the ribbon moves whilst being supported in the grinding bays by the bottom grinder discs.

In such form of apparatus, each grinder disc commonly comprises an annular grinding surface which surrounds a central aperture in the disc and is in turn surrounded by a continuous rim. The diameter of the aperture is usually nearly half the outside diameter of the disc at the rim.

The grinding surface is constituted by the operative surfaces of several concentric rings of rectangular nogs, which are separated, as islands, from one another and from the coplanar continuous rim, by approximately concentric channels intersected by straight channels extending outwardly from the central aperture to the rim. Each of the intersecting straight channels is inclined to the radius of the grinder disc drawn from the point at which it starts from the central aperture.

Abrasive fluid, usually a mixture of sand and water, is fed under a hydrostatic head to the central aperture of each grinder disc, from which it floods through the channels and across the operative surfaces of the nogs as the disc rotates, reaching the glass, where it is caught between a face of the glass and the operative surfaces of the respective nogs, finding outlet between the edges of the glass ribbon and the rim of the grinder disc.

In the case of each bottom disc the abrasive fluid is fed upwardly through the respective tool shaft into the cavity formed within the usual adaptor plate of the respective tool and the grinder disc, and the hydrostatic head on the abrasive should be such as to maintain full the cavity and the channels whilst the fluid flows to the rim as the disc rotates, so as to assure the maintenance of a requisite film of the abrasive fluid between the operative surfaces of the nogs and the undersurface of the glass against the pressure exerted by the co-operating upper disc on the glass.

This hydrostatic head, however, must be restricted so as to avoid any pressure in the central cavity exceeding a few inches of water pressure. An excessive pressure in the central aperture tends to raise the glass and prevent the pressure between the glass and the grinding surface being adequate for grinding. As a consequence of the restricted hydrostatic head, the rate of flow of the abrasive fluid up the shaft is also restricted.

The hydrostatic head on the abrasive fluid at the bottom of the shaft is then adjusted to produce the normal flow up the shaft and through the channels, while restricting the head in the central cavity. In this way, the central aperture and the channels are, under normal conditions, maintained full of abrasive fluid.

The ribbon may be formed by rolling apparatus in front of a glass melting tank furnace in a position predetermined with reference to the grinding apparatus, but is of variable width, the width being dependent on several factors, such as the height and temperature of the glass in the tank furnace, which cannot be kept absolutely constant. The ribbon retains its predetermined position for some distance down the lehr, but, by reason of small differences in the rates of cooling at the two sides, it is liable to curve sideways. Extremely small lateral curvature at a point in the lehr, say, half or two-thirds of the way down, is sufficient to deflect the position of the ribbon in the grinding and polishing apparatus, at a point some hundreds of feet distant, by several inches, and bring it into incorrect position relatively to the tools.

The resistance to outward flow of abrasive from each grinder disc of the known form is almost entirely at the rim of the grinder, and in order to obtain a requisite mass movement of abrasive the arrangement is such that the ribbon of glass when of normal width does not quite cover the usual continuous circumferential channel which separates the outer series of nogs from the rims of the discs and thereby a balance between outflow and feed of abrasive fluid is achieved, but if the superficial area of the circumferential channel exposed is increased by the ribbon width decreasing, or by lateral movement of the ribbon, the resistance to mass flow, occurring at the rim, is reduced and engenders an excessive flow of fluid from the discs.

This leads to an abnormally high rate of flow of the abrasive fluid from the central cavity, and this rate of flow may be higher than the rate of flow up the shaft to the central cavity. Consequently the central cavity becomes partially emptied, the surface of the water at its centre is depressed in paraboloidal form, and the air pressure in the cavity is lowered.

As a result of a lowering of air pressure in the central cavity, the glass is sucked downwards and is slightly bent, thus increasing abnormally the pressure between the glass and the edges of the grinding surface at the periphery of the central cavity. The iron grinding surface at these edges then comes into contact with the glass without an interposed film of abrasive fluid and the iron of the nogs bears severely and directly on the glass and scores the glass, or causes "firing," thereby breaking and/or spoiling good glass by causing "plate marks," and excessive wearing of the inner nogs which ultimately produces a conicity in the grinding surface requiring removal of the grinder disc.

It is wholly impractical to vary the hydrostatic head on the abrasive to any particular bottom grinder disc in order to restore the balance between outflow and feed when such excessive flow occurs, owing to the large superficial area of a disc, as any increase in fluid pressure under the glass acting on so great an area would lift the glass ribbon from the said grinder disc and separate it from the grinding surface, thereby increasing the pressure on the top grinder disc and decreasing the pressure on the bottom grinder disc and permitting the formation of a layer of sand and water thick enough to prevent efficient grinding.

The main object of the present invention is to prevent the occurrence of a suction effect on flat glass in ribbon form in the event of a partial vacuum being formed within the cavity of the bottom tool.

In accordance with the present invention a method is devised for protecting horizontally disposed flat glass as it is continuously advanced between co-axial grinding tools operating on both faces of the glass simultaneously which consists in continually venting the central cavity of each tool operating on the underface, thereby immediately relieving any vacuum produced by a depression of water level in the central cavity and eliminating a suction effect on the glass.

A bottom grinder constructed according to the invention comprises a vent pipe in the cavity, the vent being disposed near the level of the grinding surface and the end open to the atmosphere being disposed at a greater radius than the vent. In such construction the vent opening is preferably restricted, as hereafter described with reference to the accompanying drawings.

In order that the invention may be more clearly understood one practical embodiment as applied to a bottom tool comprising a grinding disc constructed as described in copending patent application Serial No. 112,472 will now be described by way of example with reference to the accompanying drawings.

The bottom tool illustrated comprises a grinder disc having a grinding surface constituted by curved bars 12 and 13 of spiral form which are continuously curved outwardly and forwardly as fully described in the said co-pending patent application, and a narrow rim 14, the bars being separated by distributing channels 15 which merge with the ends of discontinuous channels 16 which separate the shorter bars 13 from the rim.

The disc which is centrally apertured as indicated at 17 is mounted on the flange 19 of a tool 20 by the intermediary of a casting 21, usually referred to as an "adaptor plate," which with the tool and disc form a central cavity 17a to which abrasive is fed upwardly through the shaft of the tool the mouth of the cavity 17a being constituted by the central aperture 17 of the disc.

To prevent a depression of water level being formed in the cavity under the conditions already explained, or if the ribbon breaks, the tool flange 19, is bored and tapped at 23 for the reception of short pipes 24 and 25, the latter communicating with the atmosphere outside the usual splash guard 26 of the tool. The pipe 24 is connected by a slightly upwardly inclined pipe 27 to an elbow 28 in which is mounted the vent 29, which elbow may be carried by a bracket 30 mounted on the tool flange 19.

It will be observed that the conduit, comprising the parts 29, 28, 27, 24, 23, 25, extends downwardly and outwardly from the vent 29 to the connection with the atmosphere.

The vent 29 is disposed near the centre of the disc (where it is substantially unaffected by centrifugal force developed on the rotation of the tool) and therefore, the vent may advantageously be made of flexible piping, e. g. rubber hose, and the upper end disposed in close proximity to the glass passing over the disc.

Any sand and water entering the conduit is discharged by gravity (due to downward direction of conduit) aided by centrifugal force (due to outward direction of conduit).

The opening 31 is preferably placed at the centre of a disc near the upper surface of the grinding disc i. e. in the vicinity of the underface of a ribbon of glass supported by the disc, since it is here that the air space starts to form as the water level is depressed. The end part 29 is advantageously made of rubber or other soft material, in case it comes into contact with the glass when the grinding surface wears.

The present invention is applicable to the known form of grinder disc comprising concentric rings of nogs each separated from the next as islands and to any form of grinder disc comprising channels which lead the abrasive from a central cavity to the edge of the disc, and the present invention comprises the combination of venting means as herein described with a bottom grinder tool having a grinder disc of either such form, as a means of preventing breakage by scoring and firing of the glass when there is an excessive flow of fluid from the disc.

In a modified form of the invention to prevent delay in venting the cavity due to the conduit being full of water and sand, the vent opening 31 is covered by an apertured plate disposed so that the aperture is co-axial with the vent, the area of the aperture being considerably less than the cross sectional area of the vent. Experiments have shown that an aperture having an area of about a quarter of the area of the said cross section assures the maintenance of air passages to the cavity through the said conduit. The conduit comprising the parts 23, 24, 25, 27, 28 and 29 may be of large enough bore everywhere, in relation to the size of the inlet at the centre of the disc, to ensure that it never runs full, so that even while sand and water are running out through it, it is possible for air to be inspired through it in the opposite direction the moment a depression of the water level forms.

I claim:

1. A method of protecting horizontally disposed flat glass as it is continuously advanced between co-axial grinding tools operating on both faces of the glass simultaneously, consisting in admitting atmospheric air into the central cavity of each tool operating on the underface in the vicinity of said under face, thereby immediately relieving any vacuum produced by a depression of water level in the central cavity and eliminating a suction effect on the glass.

2. A grinding tool for grinding the undersurface of flat glass simultaneously with the grinding of the upper face in which the abrasive fluid is fed to a central cavity in the tool and flows through channels in the grinding surface to the edge of the tool, characterised by a venting conduit leading from the upper part of the central cavity at a point near the axis of the tool through a wall of the cavity to atmosphere at a point distant from the axis, the venting conduit extending downwardly as well as outwardly at all points.

3. A grinding tool according to claim 2 characterised in that the opening in that end of the venting conduit which is situated in the central cavity is restricted with respect to the diameter of the conduit but is coaxial with the conduit at that end thereof, whereby the maintenance of air passage to the cavity through said conduit is assured substantially as described.

4. A grinding tool according to claim 3, wherein that end of the venting conduit which is situated in the central cavity is disposed near the level of the grinding surface of the tool and is constituted by flexible tubing.

5. A grinding tool according to claim 2, wherein that end of the venting conduit which is situated in the central cavity is disposed near the level of the grinding surface of the tool and is constituted by flexible piping.

6. A bottom grinding tool for grinding the under face of flat glass in ribbon form as it is continuously advanced in a horizontal plane, said grinding tool having a grinding surface constituted by the upper surface of a series of bars of spiral form curved outwardly and forwardly in the intended direction of the rotation of the disc, distributing channels separating the said bars, a series of peripheral channels connecting the distributing channels in pairs near the periphery of the grinding tool, a central cavity in the tool to which abrasive fluid is fed through the channels, and a venting conduit leading from the upper part of the central cavity at a point near the axis of the tool through a wall of the cavity to atmosphere at a point distant from the axis, the venting conduit extending downwardly as well as outwardly at all points.

JAMES HARRIS GRIFFIN.

REFERENCES CITED

The following references are of record in the file of this patent:

UNITED STATES PATENTS

| Number | Name | Date |
| --- | --- | --- |
| 2,041,612 | Griffin | May 19, 1936 |